S. H. ELLIS.
Fence-Post Sockets.
No. 152,091. Patented June 16, 1874.
Fig. 1.
Fig. 2.
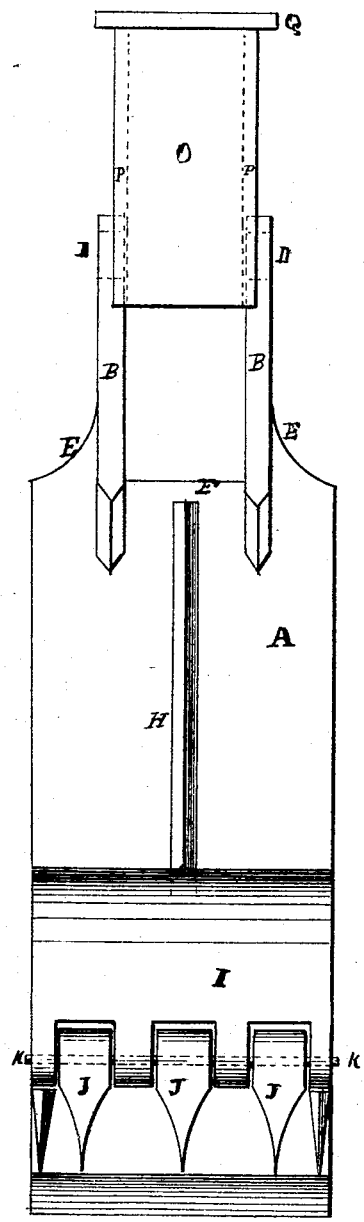
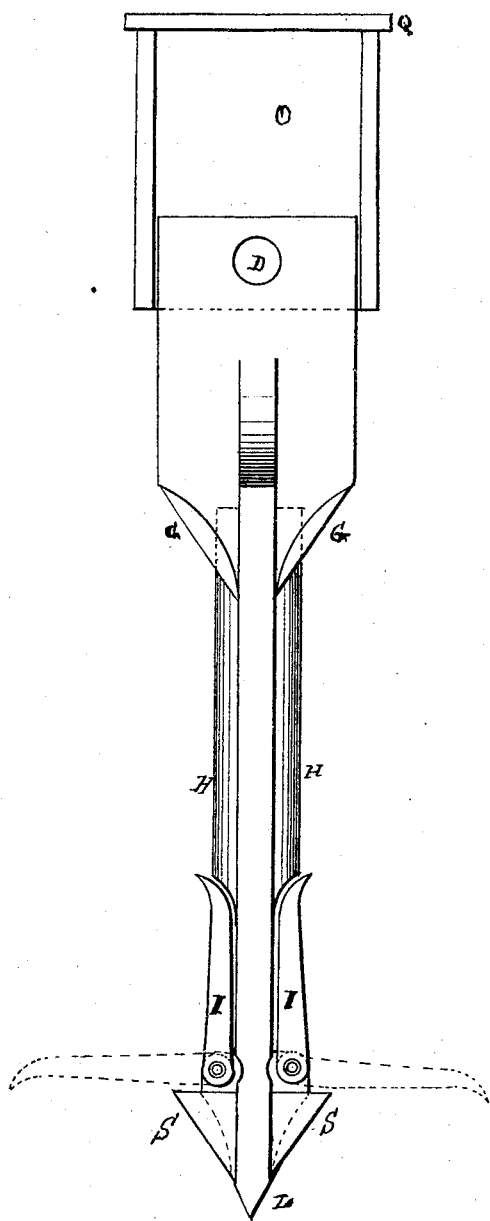
WITNESSES:
P. C. Dietrich
W. C. McArthur
INVENTOR.
S. H. Ellis
per T. H. Alexander
ATTORNEY

UNITED STATES PATENT OFFICE.

SIMEON H. ELLIS, OF NEW MOSCOW, OHIO.

IMPROVEMENT IN FENCE-POST SOCKETS.

Specification forming part of Letters Patent No. 152,091, dated June 16, 1874; application filed April 2, 1873.

*To all whom it may concern:*

Be it known that I, SIMEON H. ELLIS, of New Moscow, in the county of Coshocton and State of Ohio, have invented certain new and useful Improvements in Post-Sockets; and I do hereby declare the following to be a full, clear, and exact description thereof, reference being had to the accompanying drawing and to the letters of reference marked thereon.

The nature of my invention consists in the construction and arrangement of a post-socket for the attachment of fence or other posts, as will be hereinafter more fully set forth.

In order to enable others skilled in the art to which my invention appertains to make and use the same, I will now proceed to describe its construction and operation, referring to the annexed drawing, in which—

Figure 1 is a front view, and Fig. 2 a side view, of my invention.

A represents a rectangular plate of any suitable dimensions, the upper end of which forms a brace or stay, E, at each side, for supporting transverse plates B B, attached to, or formed with, the plate A, and extending up above the same for a suitable distance. These two plates B B form the receptacle to receive the post, and they are further supported by means of corner-braces G G. On each side of the plate is a central longitudinal flange, H, to strengthen the plate. These flanges extend up above the corner-braces G G. The lower end of the plate A is beveled on both sides, forming a sharp edge, L; and above said edge, on each side of the plate, are projecting arms S S, forming rests for a latch-plate, I I, which is hinged to a series of hinge-blocks, J, on the plate A by means of a rod, k.

The catch-plates I I have their upper ends beveled outwardly when they stand in a vertical position, as fully seen in Fig. 2.

The flanges H H extend down to the plates I I, and may be beveled, as shown, so as to allow the plates to be in a position parallel with the main plate A, when desired.

O is a driver-block, inserted between the plates B B, and resting upon enlarged portions F of the plate A. This driver-block is provided with a head, Q, and is held in place, while being driven, by means of safety-flanges P P.

In ground free from stone the socket is to be driven in when the earth is very wet by the use of the driver-block and a wooden mallet, the plate or blade A being placed edgewise to the line of the fence. After being driven in to the desired depth, the flat edge of a crow-bar is inserted behind the latch-plates I I, and they are forced outward slightly, and a little earth worked in behind them, so as to give them a start into the earth on each side.

In the lower end of the fence-post to be inserted in this socket is made an open-ended mortise, which is set astride of the thick metal at F, and the post fastened by means of a wooden pin passing through the post, and through the holes D D in plates B B.

During the winter, when there is frequent changes from frost to thawing, and vice versa, posts will invariably work up; but, with this socket, when the action of the frost commences to pull up, the latch-plates I I will enter the walls of the excavation, and, as soon as they become horizontal and rest on the braces S S, the socket cannot rise any farther, but will remain stationary.

If the sockets are used for the posts of a grape-trellis, the broad side of the blade A is to be placed to the strong winds, the flanges H H preventing the plate from breaking or turning edgewise. This will admit of letting down the entire trellis between the rows to be covered during the winter.

If the ground is stony, or has an under hard stratum, a hole is to be dug for the post-socket, and the socket placed therein, with the latch-plates horizontal at once.

Though this device will at first cost more than putting down posts in the ordinary way, still, by reason of its durability and permanence, it will prove far cheaper in the end for any purpose where posts are to remain solid in the ground.

Having thus fully described my invention, what I claim as new, and desire to secure by Letters Patent, is—

1. The latch-plates I I, hinged to, and operating in combination with, the plate A, substantially as and for the purposes herein set forth.

2. A post-socket having flanges H H, latch-plates I I, stops S S, blocks J J, and point L, all as and for the purpose set forth.

SIMEON H. ELLIS.

Witnesses:
 ELI HUFF,
 TUNIS S. BROWN.